US008164206B2

(12) United States Patent
Gibson et al.

(10) Patent No.: US 8,164,206 B2
(45) Date of Patent: Apr. 24, 2012

(54) METHODS AND SYSTEMS FOR ENGINE START CONTROL

(75) Inventors: Alex O'Connor Gibson, Ann Arbor, MI (US); Allan Roy Gale, Livonia, MI (US); Joseph Norman Ulrey, Dearborn, MI (US); Ross Dykstra Pursifull, Dearborn, MI (US); John DeMarco, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 12/412,187

(22) Filed: Mar. 26, 2009

(65) Prior Publication Data

US 2010/0244459 A1 Sep. 30, 2010

(51) Int. Cl.
*H02P 1/00* (2006.01)
*F02N 11/08* (2006.01)

(52) U.S. Cl. .................................. 290/38 R; 123/179.3

(58) Field of Classification Search .................... 290/31, 290/38 R, 50; 123/179.1, 179.28, 179.3; 307/10.6
See application file for complete search history.

(56) References Cited

U.S. PATENT DOCUMENTS

| | | | | |
|---|---|---|---|---|
| 6,617,830 | B2 | 9/2003 | Nozu et al. | |
| 6,718,927 | B2 * | 4/2004 | Goetze et al. | 123/179.3 |
| 7,134,414 | B2 | 11/2006 | Ries-Mueller et al. | |
| 7,516,726 | B2 * | 4/2009 | Esaka et al. | 123/179.3 |
| 7,806,095 | B2 * | 10/2010 | Cook et al. | 123/179.3 |
| 2007/0119403 | A1 | 5/2007 | Laubender | |
| 2008/0077308 | A1 | 3/2008 | Laubender | |

FOREIGN PATENT DOCUMENTS

| | | | |
|---|---|---|---|
| JP | 63306277 | A * | 12/1988 |
| JP | 03213662 | A * | 9/1991 |
| WO | 03/099605 | | 12/2003 |

* cited by examiner

*Primary Examiner* — Tran Nguyen
(74) *Attorney, Agent, or Firm* — Allan J. Lippa; Alleman Hall McCoy Russell & Tuttle LLP

(57) ABSTRACT

Methods and systems are provided for starting an engine in a vehicle. In one example, two or more energy storage devices are coupled in series to improve engine starting. The method and system may reduce engine starting time.

20 Claims, 4 Drawing Sheets

METHODS AND SYSTEMS FOR ENGINE START CONTROL

FIELD

The present application relates to methods and systems for controlling an engine restart.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like.

In vehicles with such idle-stop systems, an engine may often be restarted following a relatively short idle-stop period, for example following a short wait at the traffic light. To expedite engine restart at the end of the short idle-stop period, high power and fast-turning starters may be used. However, such starters may substantially increase vehicle costs while still not achieving satisfactory restart times. To achieve rapid engine restarts, higher starter accelerations and starter speeds may be needed.

In one example approach, engine restart may be expedited by adjusting a starter voltage, as shown by Heni et al. in WO 03/099605. Herein, during an engine restart, the voltage supplied to an electric starter motor is adjusted by adding or subtracting voltages from a first and second energy store, such as from a battery and a capacitor, using a DC-DC converter.

However, the inventors herein have recognized several potential issues with such a system. As one example, the electrical configuration of Heni's approach may only be advantageous for high-end vehicle systems where the starter and generator are combined. As such, high-end vehicle systems may include brushless starting systems and complex electrical circuits for operating them. Thus, the approach of Heni et al. may add substantial costs, without substantial benefits, to vehicle systems including simpler brushed alternators and starters. As another example, the approach of Heni et al. necessitates the use of a DC-DC converter to add or subtract the voltages from the energy stores in the fixed electrical configuration. The incorporation of components such as the DC-DC converter may also add substantial cost and complexity to a vehicle system.

Thus, in one example, some of the above issues may be addressed by a method of starting an engine in a vehicle, the engine including a starter, the vehicle including a plurality of energy storage devices electrically coupled to the starter. One example embodiment comprises, during a first charging condition, electrically coupling the plurality of energy storage devices in parallel to each other; and during a second discharging condition, electrically coupling the plurality of energy storage devices in series to each other and to the starter to actuate the starter and rotate the engine.

As one example, a first and second energy storage device, such as a battery and a capacitor (for example, an ultra-capacitor or a super-capacitor), may be arranged in an electrical configuration that enables voltage-doubling. Specifically, the battery and the capacitor may be electrically connected in a parallel configuration to each other and to an alternator so as to charge each energy storage device to the same voltage (for example, 12V). Subsequently, when a higher boost voltage is needed (such as, to expedite cranking at engine start), a relay may be used to electrically connect the devices in a series configuration, thereby providing a doubled voltage output (for example, 24V). A diode may be used to ensure an appropriate direction of current flow. Additionally, a charging-rate-controlling resistor may be included in the circuit to enable the charging rate of the capacitor to be varied, for example, based on operating conditions and/or charging opportunities. The electrical configuration may also enable voltage droops and voltage spikes to be absorbed during transient electrical loading. In this way, use of the energy storage devices in the specified electrical configuration may be synergistically applied for both an expedited engine start and for reduced voltage transients during electrical loading.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
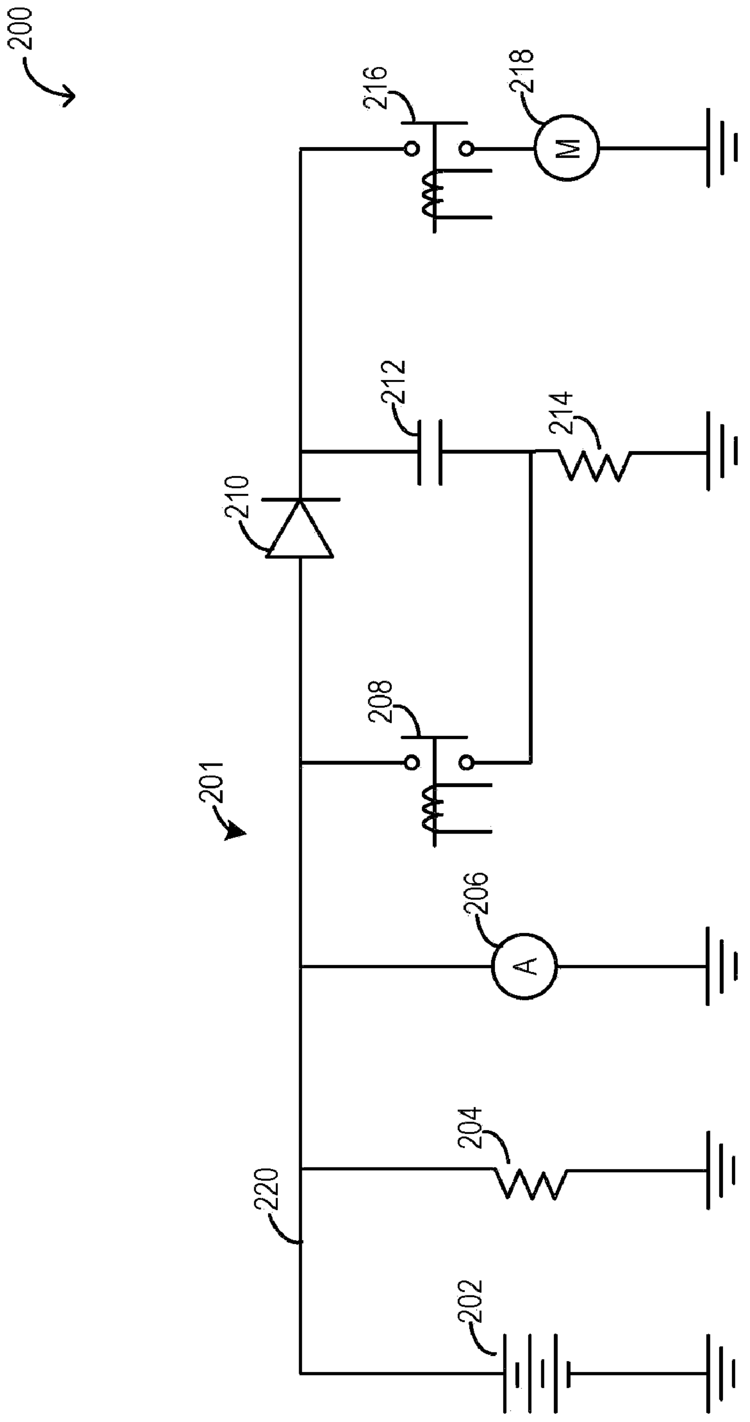
FIGS. 2-3 show detailed descriptions of the components introduced in the vehicle system of FIG. 1.
Figure 3:
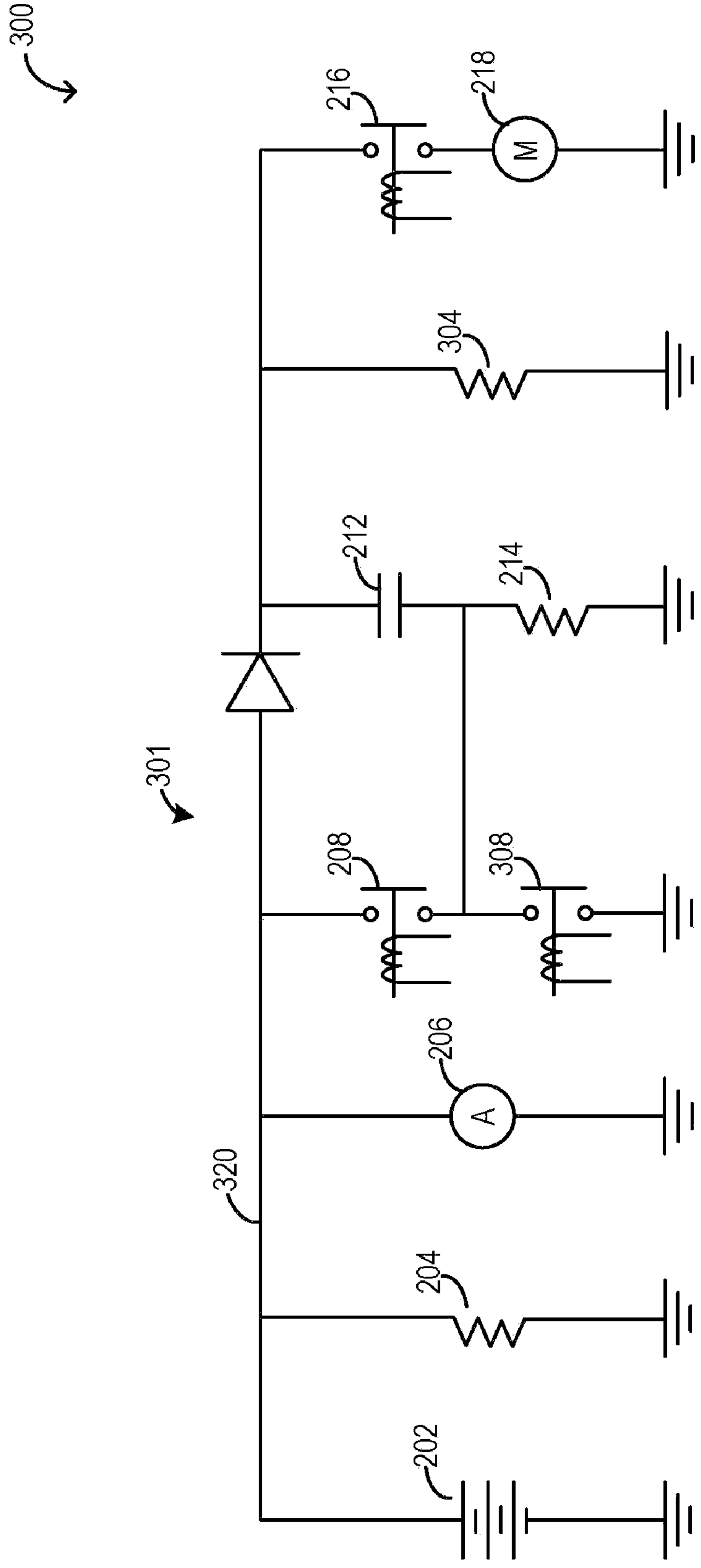

The following description relates to systems and methods for expediting engine restart from idle-stop, to thereby improve engine restart quality and provide fuel economy. A plurality of energy (or charge) storage devices may be electrically coupled to the starter system of FIG. 1 so as to enable the voltage applied across the starter system to be varied. As shown in FIG. 2, a voltage supplied to the starter system may be adjusted (for example, increased), to thereby enable higher starter speeds and accelerations during engine crank. As shown in FIG. 3, the energy storage devices may also be coupled to electrical loads, such as an electric power assisted steering load, to compensate for voltage fluctuations, as may occur during transient electrical loading. An engine controller may be configured to perform a control routine, such as the routine depicted in FIG. 4, to adjust the voltage output and/or the charging/discharging rate of the energy storage devices responsive to vehicle operating conditions. In this way, the energy storage devices coupled to the starter system may be synergistically applied for both expediting engine restarts, and reducing voltage transients during electrical loading. In doing so, the quality of engine restarts and overall engine performance may be improved.

Figure 1:
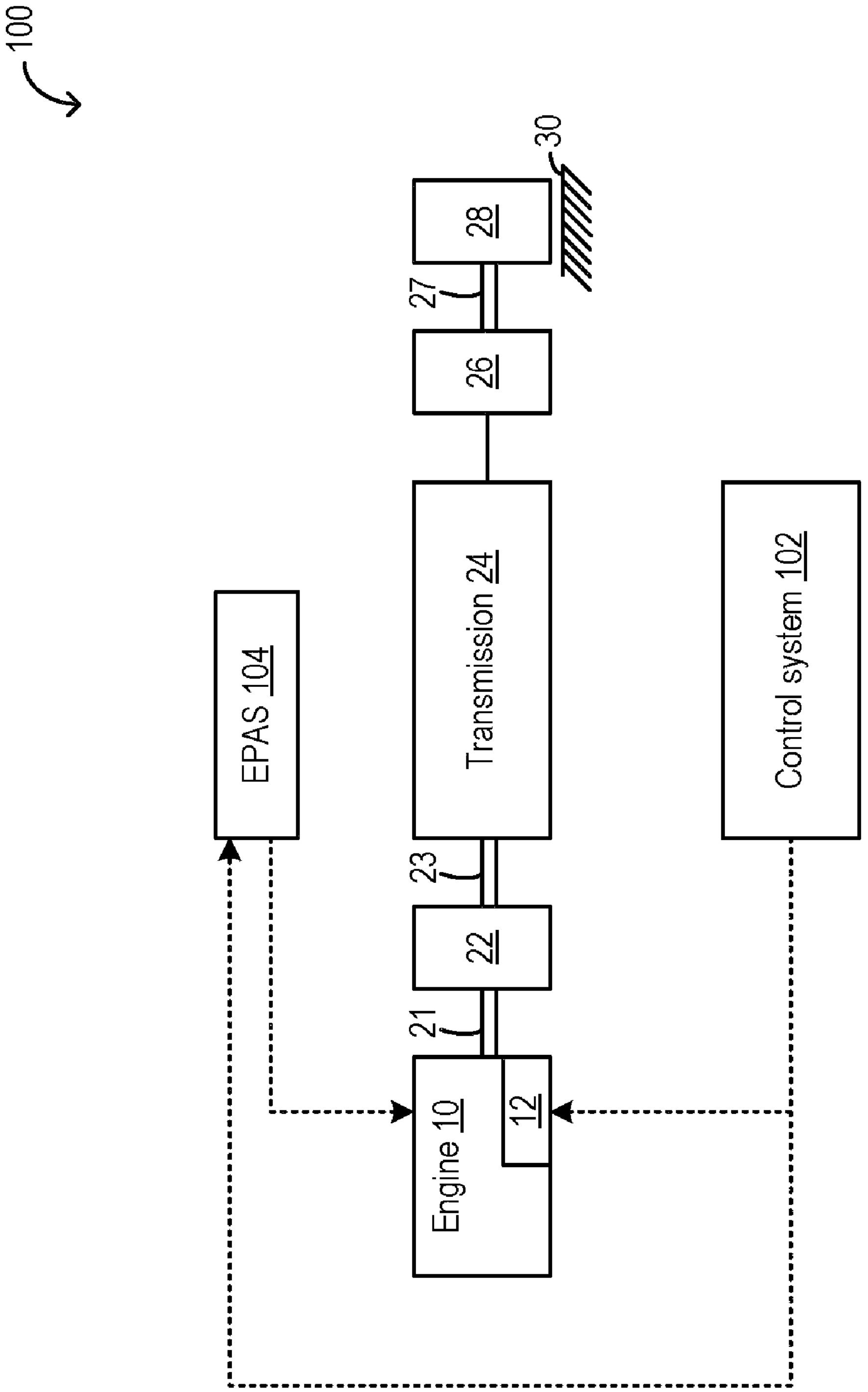
FIG. 1 shows an example vehicle system layout.

FIG. 1 depicts an example embodiment of a vehicle system 100. As illustrated, an internal combustion engine 10 is shown coupled to torque converter 22 via crankshaft 21. Engine 10 may be started with an engine starting system 12, including a starter. In one example, as depicted in FIGS. 2-3, the starter may be a motor-driven (or battery-driven) starter. In another example, the starter may be a powertrain drive motor, such as a hybrid powerplant connected to the engine by way of a coupling device. The coupling device may include a transmission, one or more gears, and/or any other suitable coupling device. Operation of the engine starting system 12 may be controlled by engine control system 102. As further elaborated with reference to FIGS. 2-3, the engine control system 102 may be configured to open or close a series of relays to accordingly enable the voltage applied across the engine starting system 12 (for example, the voltage applied across a starter motor of the starting system) to be varied. Specifically, the control system may be configured to electrically couple one or more energy storage devices (such as a battery and/or a capacitor) to the engine starting system 12. By adjusting the voltage applied across the engine starting system 12 at engine start (or during engine crank), the speed and/or acceleration of the starting system may be increased and an engine restart may be expedited.

Torque converter 22 is also coupled to transmission 24 via turbine shaft 23. Torque converter 22 has a bypass, or lock-up clutch (not shown) which may be engaged, disengaged, or partially engaged. When the clutch is either disengaged or partially engaged, the torque converter is said to be in an unlocked state. The lock-up clutch may be actuated electrically, hydraulically, or electro-hydraulically, for example. The lock-up clutch may receive a control signal from the controller, such as a pulse width modulated signal, to engage, disengage, or partially engage, the clutch based on engine, vehicle, and/or transmission operating conditions.

Turbine shaft 23 is also known as a transmission input shaft. Transmission 24 comprises an electronically controlled transmission with a plurality of selectable discrete gear ratios. Transmission 24 also comprises various other gears, such as, for example, a final drive ratio 26. In alternate embodiments, a manual transmission operated by a driver with a clutch may be used. Further, various types of automatic transmission may be used. Transmission 24 is coupled to tire 28 via axle 27. Tire 28 interfaces the vehicle (not shown) to the road 30. In one embodiment, the powertrain of vehicle system 100 is coupled in a passenger vehicle that travels on the road.

Vehicle system 100 may further include an electric power assisted steering load, EPAS 104. EPAS 104 may be configured to reduce the steering effort required in vehicle system 100 by using an electric power source (for example, an electric motor) to assist a driver in the steering of vehicle tires 28. The electric motor of EPAS 104 may be powered by an alternator coupled to engine 10. A control system may be configured to adjust the operation of EPAS 104 responsive to the speed of vehicle system 100. For example, more steering assistance may be provided from EPAS 104 as the speed of the vehicle decreases while less steering assistance may be provided as the speed of the vehicle increases. Additionally, as further elaborated with reference to FIG. 3, control system, 102 may be configured to open or close a series of relays to accordingly enable voltage transients generated during the operation of EPAS 104 (for example, when EPAS is started or stopped) to be absorbed. Specifically, the control system may be configured to electrically couple one or more energy storage devices (such as one or more capacitors) to EPAS 104 during EPAS operation to absorb voltage fluctuations (for example, by charging or discharging the capacitor). By absorbing voltage transients generated across the EPAS 104, component damage may be reduced and the performance of the vehicle system may be improved.

FIG. 2 depicts an example embodiment 200 of an electrical configuration for the vehicle system of FIG. 1 that enables voltage-doubling and the transmission of the higher voltage to the starter system. By enabling a higher starter voltage, starter speeds and accelerations may be increased, thereby expediting engine restarts.

The electrical configuration includes an electrical circuit 201 with a plurality of energy storage devices in a parallel arrangement. The depicted example includes two energy storage devices, however in alternate examples, a larger number of devices may be included. The plurality of energy storage devices may include a battery 202 and a capacitor 212. Capacitor 212 may be an ultra-capacitor or a super-capacitor. As such, the capacitor and the battery may be interchangeable with each other, as well as with other suitable energy storage devices.

A first end of battery 202 may be connected to an electrical ground while a second end of the battery may be connected to a node 220 of the electrical circuit 201. The other energy storage device, that is capacitor 212, may also be electrically grounded at one end. In one example, as depicted, a first end of the capacitor may be connected to the electrical ground through a charge-rate-controlling resistor 214. The second end of the energy storage device may be connected to the node 220 of the electrical circuit 201 through a semiconductor, such as diode 210 such that the capacitor is connected in parallel to the battery.

An alternator 206 may be included in electrical circuit 201, connected in parallel to battery 202 and capacitor 212. A first end of the alternator may be connected to the electrical ground while a second end of the alternator may be connected to the node 220 of the electrical circuit such as to enable the parallel configuration. Alternator 206 may be configured to charge battery 202 and capacitor 212 to a common (first) voltage. Alternator 206 may also be configured to power the vehicle's electrical loads when the engine is running.

As connected, in the parallel configuration, capacitor 212 may be slowly charged to the battery 202 voltage by alternator 206. In one example, the battery voltage may be 12V. Accordingly, the capacitor 212 may also be charged to 12V. The charging rate of capacitor 212 may be varied by charge-rate-controlling resistor 214. Alternatively, other suitable charge-rate-varying devices may be used, such as a DC-DC converter. However, such alternate charge-rate-varying devices may add substantial cost and complexity to the system. While the depicted embodiment includes a single capacitor 212, in alternate embodiments, a plurality of capacitors may be included in series to each other, each capacitor configured to be charged to the battery voltage, the charging rate of each controlled by respective charge-rate-controlling resistors.

The discharging rate of capacitor 212 may also be varied, using relays, such that capacitor 212 may be advantageously used in tandem with battery 202 to provide a constant low power discharge during continual baseline starter operations while providing a pulse power during peak load starter operations. For example, a voltage-doubler relay 208 may be included in the electrical circuit. A first end of the voltage-doubler relay 208 may be connected in between capacitor 212 and charge-rate-controlling resistor 214 while a second end of the voltage-doubler relay 208 may be connected to the node 220 of the electrical circuit 201 through a diode 210. In this configuration, when closed, voltage-doubler relay 208 may be configured to electrically couple battery 202, capacitor 212, and starter motor 218 to each other, in series.

As such, capacitor 212 may provide a pulse of energy with high efficiency. By using capacitor-based energy storage devices, the use of multiple battery-based energy storage devices during peak power operations may be reduced, thereby extending system battery life and reducing overall battery size and costs. Furthermore, capacitor-based energy storage devices may be cycled through a plurality of charging and discharging cycles without any substantial loss in performance.

Vehicle electrical loads 204 may also be connected in parallel to battery 202 and capacitor 212. Vehicle electrical loads 204 may include cabin heating, air-conditioning, accessory loads, etc. A first end of the vehicle electrical load 204 may be connected to the electrical ground while the second end of the vehicle electrical load 204 may be connected to the node 220 of the electrical circuit 201.

The vehicle engine may include a starter, the starter coupled to a starter motor 218. Starter motor 218 may also be connected in parallel to battery 202 and capacitor 212. Specifically, a first end of the starter motor 218 may be connected to the electrical ground while the second end of the starter motor 218 may be connected to the node 220 of the electrical circuit 201 through a starter motor relay 216.

During engine idle-stop conditions, a controller may be configured to open voltage-doubler relay 208 to electrically couple battery 202, capacitor 212, and starter motor 218 in parallel to each other. As such, this may represent a charging condition wherein alternator 206 is configured to charge each of battery 202 and capacitor 212 to a first voltage (for example, 12V).

At engine restart, that is, during engine crank, starter motor relay 216 may be closed to initiate an operation of the starter motor, and hence the starter system. The starter motor 218 speed and acceleration may then be substantially increased by providing a higher (that is, boost) voltage (or current) across the motor 218. For example, a quick start involving an approximate 240 degrees of engine rotation may be attained with the application of a current of 600-800 amps for 200 ms. The high voltage requirement for the expedited start may be achieved by adjusting the electrical configuration to a voltage-doubler configuration. As such, this may represent a discharging condition. Herein, a controller may be configured to close voltage-doubler relay 208 to electrically couple battery 202, and capacitor 212 in series to each other, and to starter motor 218. It will be appreciated that, in an alternate embodiment, the engagement of both voltage-doubler relay 208 and starter motor relay 216 may be triggered by a common signal, such as an indication of engine cold start and/or engine crank. In this way, a net output voltage from the energy storage devices, now connected in series, may be increased, and a second, higher voltage, may be applied across the starter. In one example, the second, higher voltage is double the first voltage. That is, the voltage output of the battery and the capacitor may be applied in series across the starter motor, to enable the starter motor to experience up to a double voltage (for example, 24V). By applying a higher voltage across the starter motor, the starter may be actuated and rotation of the engine may be expedited.

During voltage doubling, diode 210 may ensure a proper flow of current from the battery 202 and capacitor 212 towards the starter motor 218. Furthermore, diode 210 may reduce energy lost to the charge-rate-controlling resistor 214. In alternate embodiments, diode 210 may be replaced with a suitable device capable of preventing improper current flow. In one example, diode 210 may be replaced with another relay that opens before the voltage-doubler relay 208 is closed. Diode 210 further enables capacitor 212 to be "topped off" to the maximum transient voltage seen at node 220. For example, if the voltage at node 220 is higher than the voltage experienced at the capacitor 212, diode 210 may enable the surplus voltage to be advantageously stored as charge in the capacitor. In one example, when applying the second, higher voltage across the starter motor, closing of the voltage-doubler relay 208 may be controlled to stage the application of the higher (double) voltage. As such, this may allow the starter in-rush current to be advantageously limited, thereby providing component sizing advantages. For example, by staging the application of the double voltage, a starter motor of a smaller size may be used.

In one example, such as during an engine cold-start, the start-to-rotate current (that is, the current needed to start spinning the starter motor and before a back-EMF builds) may be provided by the capacitor 212. To do so, starter motor relay 216 may be closed to start operating the starter, while voltage-doubler relay 208 remains open. Herein, before the voltage-doubler relay 208 is closed, diode 210 may ensure that capacitor 212 is appropriately discharged to provide the start-to-rotate current (for example, 100 amps). Thus, for an extended crank period, the starter motor 218 and diode 210 may be exposed to the start-to-rotate current. Subsequently, to expedite the engine restart, voltage-doubler relay 208 may be closed to provide the voltage boost. That is, voltage-doubler relay 208 may be closed so that the power supplied from both the battery and the capacitor may be applied in series across the starter motor. Furthermore, the closing of voltage-doubler relay 208 may be adjusted so that the boost voltage is applied in stages and the starter in-rush current is limited. Once the restart is achieved, the voltage-doubler relay 208 may be opened. Then, once the back-EMF has built up, a constant (lower) current may be provided to the starter motor 218 by battery 202. It will be appreciated that the electrical connection between the capacitor 212 and starter motor relay 216 may be of a low resistance while the electrical connection between the capacitor 212 and battery 202 may be of a high resistance to bias the higher current towards the starter motor instead of the battery.

In this way, the burden of a high-current demand for initializing starter rotation may be taken off the vehicle battery. By reducing the high-current demand, the energy storage and energy delivery rate of the vehicle battery may be lowered. Since the battery voltage may experience a substantially lower drop when the starter motor is engaged, the voltage range specification for vehicle electrical components connected to the vehicle battery may be relaxed. Furthermore, the vehicle battery can be made smaller and with deep cycle technology.

In this way, the incorporation of a capacitor-based energy storage device allows the starter motor to receive a higher current for a longer period of time than may have been possible with only a battery-based energy storage device. By connecting the energy storage devices in a parallel configuration for charging purposes and in a series configuration for discharging purposes, and further using a relay to alternate between the series and parallel configurations, the capacitor-based energy storage device may be advantageously used in conjunction with the battery-based energy storage device to increase the power supplied to a vehicle starter system, thereby expediting engine start times.

FIG. 3 depicts another example embodiment 300 of an electrical configuration for the vehicle system of FIG. 1. The depicted configuration enables compensation for voltage transients during transient electrical loading. By absorbing voltage transients (such as voltage droops and spikes), experienced during the adjustment of electrical loads, the performance and life of system electrical components may be enhanced. It will be appreciated that components previously introduced in FIG. 2 may be similarly numbered in FIG. 3 and may not be re-introduced for reasons of brevity.

The electrical configuration of embodiment 300 includes an electrical circuit 301 with a plurality of energy storage devices, such as battery 202 and capacitor 212, arranged in parallel to an alternator 206, a starter motor 218, and vehicle electrical loads 204. An additional electrical load may also be included in circuit 301. In one example, the additional electrical load is an electric power assisted steering (EPAS) load 304. The EPAS load may be configured to enable a powered steering of the vehicle. As such, EPAS load 304 may be a subcategory of vehicle electrical load 204. However, for purposes of clarifying the use of the capacitor 212 in the transient electrical loading of vehicle electrical loads such as an EPAS load, EPAS load 304 is depicted as being distinct from vehicle electrical load 204. The EPAS load 304 may be electrically grounded and further connected to a node 320 of the electrical circuit 301 in parallel to the starter motor 218, battery 202, and capacitor 212. During electrical loading, for example, when an EPAS is started or stopped, a voltage transient, for example, a transient voltage droop or a transient voltage spike, may be experienced. The voltage (or power) droop and/or spike may cause an electric burden on the vehicle system components, in particular on battery 202. Furthermore, the voltage transients may cause component damage. For example, a high in-rush current in EPAS load 304 may injure the EPAS and lead to degraded EPAS performance.

The inventors herein have recognized that capacitor 212, when electrically coupled to EPAS load 304, may be able to absorb the voltage transients experienced during the electrical loading, thereby improving vehicle performance. As such, EPAS load 304 is not required during engine crank. Thus, capacitor 212 may be synergistically used at engine restart to expedite engine crank, and during electrical loading to absorb voltage transients.

During an electrical loading condition, a controller may be configured to couple the capacitor 212, or an alternate charge storage device, to the EPAS load by closing an EPAS relay 308. EPAS relay 308 may be electrically grounded at a first end and may be connected to electrical circuit 301 at the second end at a point between capacitor 212 and charge-controlling-resistor 214. By closing EPAS relay 308 during electrical loading, capacitor 212 may be electrically coupled to the EPAS load 304, and may be able to absorb voltage transients generated across the EPAS. As such, the voltage transients may include conditions of voltage droops or voltage spikes. In one example, in the event of a voltage spike, for example, when the current flowing through the EPAS ($i_{EPAS}$) is greater than the current provided by the alternator ($i_{alt}$), or about to be greater than the current provided by the alternator, the voltage transient may be absorbed into capacitor 212 by charging the capacitor. In another example, in the event of a voltage droop, for example, when the voltage across the EPAS ($V_{EPAS}$) is lower than the voltage provided by the alternator ($V_{alt}$), the voltage transient may be absorbed by discharging capacitor 212 to compensate for the difference.

It will be appreciated that, in an alternate embodiment, either voltage-doubler relay 208 or EPAS relay 308 may be maintained in an engaged (that is, closed) configuration, thereby reducing the need for charge-rate-controlling resistor 214.

It will also be appreciated that, since EPAS load 304 is not required during engine crank, an engine controller may be configured to confirm that no electrical loading of EPAS load 304 occurs during a voltage-doubling operation (that is, an engine restart expediting operation). Specifically, the engine controller may be configured to confirm that EPAS relay 308 and voltage-doubler relay 208 are not engaged at the same time.

While the depicted examples do not illustrate use of a capacitor-based boost voltage to operate the EPAS load 304, it will be appreciated that such an operation may be possible. For example, the EPAS may be operated above the nominal voltage (for example, above 12V) to provide an increase in steering performance and/or to reduce steering costs. To do so, a DC-DC converter may be included in the electrical configuration to regulate the boost voltage distribution between the starter motor 218 and the EPAS load 304. In this way, the charging/discharging rate of capacitor 212 may be varied responsive to varying power conditions through the electrical circuit.

Figure 4:
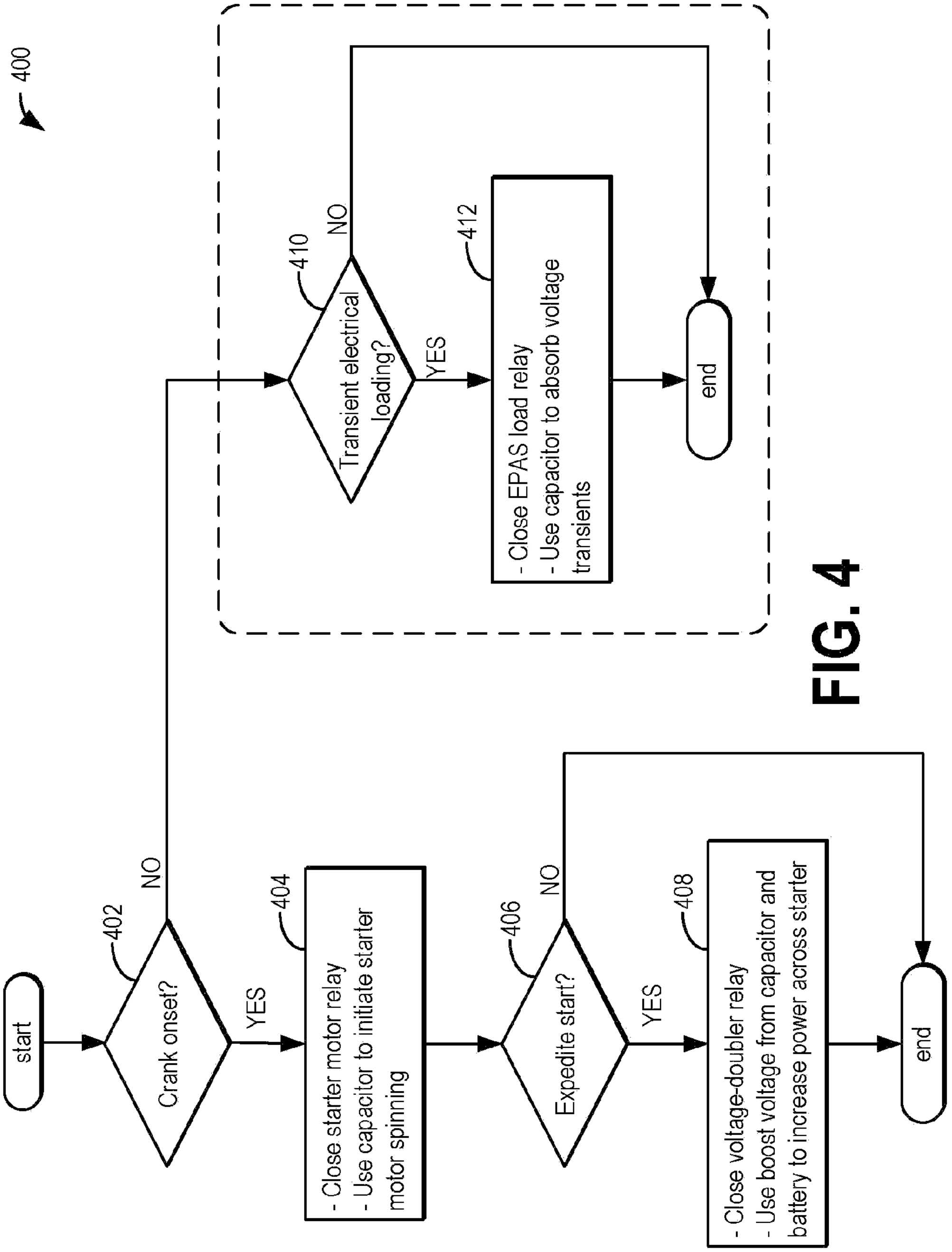
FIG. 4 shows a high level flow chart for operating the electrical configuration of FIGS. 2-3 during engine crank and/or electrical loading.

Now turning to FIG. 4, an example control routine 400 for operating the electrical configurations described in FIGS. 2-3, responsive to vehicle operating conditions, is described. In particular, the routine adjusts the power output delivered from a system battery and/or capacitor to a starter system during an engine start. Similarly, during the operation of a high electrical load (for example, the EPAS), the routine adjusts the power output transferred between the capacitor and the electrical load.

At 402, a crank onset condition may be confirmed. Specifically, it may be determined whether the engine is being restarted from an idle-stop or shut-down condition, and whether the engine requires to be cranked to be brought into a suitable starting position. If yes, then at 404, the power output of the electrical configuration may be adjusted to assist the starter system. In one example, during an engine cold start, the power output of the electrical configuration may be controllably diverted towards the starter system to assist in initiating the spinning of a starter motor. Specifically, starter motor relay 216 may be closed and the power stored in capacitor 212 may be used to initiate spinning of starter motor 218. As capacitor 212 slowly discharges, a current may be provided to the starter motor for an extended amount of time.

Following the onset of engine crank, at 406, it may be determined whether an expedited engine start is needed. If no expedited engine start is needed, the routine may end. In one example, the engine may be restarted after a relatively short engine-off period (for example, due to a short wait at a traffic light). Subsequently, a rapid engine restart may be needed. To achieve a satisfactory shorter restart time, a higher starter speed and/or acceleration may be required. Thus, if an expedited engine start is confirmed at 406, at 408, the power output of the electrical configuration may be adjusted to expedite engine restart. Specifically, voltage-doubler relay 208 may be closed and the power stored in capacitor 212 and battery 202 may be diverted to the starter system. The resulting increase in power across starter motor 218 may result in increased starter motor speeds and/or accelerations. In one example, battery 202 and capacitor 212 may both have been charged to a voltage of 12V in a parallel configuration. Upon closing relay 208, the battery and the capacitor may be shifted to a series configuration, and a boost voltage of up to 24V may be applied across the starter motor to accelerate engine restart. In another example, closing of the voltage-doubler relay 208 may be controlled to stage the application of the boost voltage. In doing so, the starter in-rush current may be limited and component degradation due to the current spike may be reduced. It will be appreciated that the steps described in 402-408 may be performed in either of the electrical configurations illustrated in FIGS. 2-3.

While the depicted example illustrates closing of starter motor relay 216 and voltage-doubler relay 208 at different times and responsive to different signals, it will be appreciated that, in an alternate embodiment, the engagement of both voltage-doubler relay 208 and starter motor relay 216 may be triggered at the same time and/or by a common signal, such as an indication of engine cold start and/or engine crank.

If a crank onset condition is not confirmed at 402, at 410, it may be determined whether a transient electrical loading condition is present. Specifically, it may be determined whether a high electrical load, such as an EPAS load, is being operated. If no electrical loading condition is present, the routine may end. If a transient electrical load is perceived, then at 412, the power output of the electrical configuration may be adjusted to enable voltage transients to be absorbed. Specifically, EPAS relay 308 may be closed and capacitor 212 may be used to absorb voltage transients. In one example, if a current spike is experienced across the electrical load, the excess voltage may be absorbed into the capacitor and stored as charge. In another example, if a voltage droop is experienced, the capacitor may be discharged by an amount to compensate for the voltage deficit. It will be appreciated that the steps described in 410-412 may only be performed in the electrical configuration depicted in FIG. 3.

In this way, a charge storage device, such as a capacitor, included in parallel to a vehicle system battery may be advantageously used to initiate and expedite starter motor spinning during engine cranking, and further used to absorb voltage transients arising due to the operation of higher electrical loads during regular engine operation. By including relays into the electrical circuit, and by adjusting the order and timing of relay closing, the distribution of power between the different system electrical components may be adjusted. By expediting engine restart times, the quality of engine restarts may be improved. Further, by absorbing voltage transients, degradation of electrical components due to such voltage transients may be improved, thereby enhancing vehicle performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for starting an engine including a start in a vehicle including a plurality of energy storage devices electrically coupled to a starter, comprising:
- during charging, electrically coupling the plurality of energy storage devices in parallel; and
- during discharging, staging electrically coupling the plurality of energy storage devices in series such that one of the plurality of energy storage devices provides energy to the starter before another of the plurality of energy storage devices.

2. The method of claim 1, where the vehicle further includes a voltage-doubler relay, the voltage-doubler relay electrically coupling the plurality of energy storage devices to each other and to the starter in a series configuration, and wherein, during charging, the voltage-doubler relay is open to electrically uncouple the series configuration.

3. The method of claim 2, where during discharging, the voltage-doubler relay is closed.

4. The method of claim 3, where the starter includes a starter motor and a starter motor relay, and where the starter motor relay is closed to initiate operation of the starter motor during discharging.

5. The method of claim 1, where the discharging is during an engine cold start and engine cranking.

6. The method of claim 1, where the plurality of energy storage devices includes at least a battery and a capacitor.

7. The method of claim 1, where during charging, the plurality of energy storage devices are charged to a first voltage.

8. The method of claim 7, where during discharging, a second voltage higher than the first voltage is applied to the starter.

9. The method of claim 8, where the second voltage is double the first voltage.

10. The method of claim 8, where applying a second voltage higher than the first voltage includes coupling a capacitor to the starter.

11. A method for starting an engine including a start in a vehicle including a plurality of energy storage devices electrically coupled to a starter, comprising:
- discharging a first energy storage device and a second energy storage device when the first and second energy storage devices are electrically coupled in series to start the engine; and
- coupling the second energy storage device to an electrical load in response to a transient electrical load.

12. The method of claim 11, further comprising coupling the first and second energy storage devices in parallel and charging the first and second energy storage devices.

13. The method of claim 11, where the electrical load is an electric power assisted steering load.

14. The method of claim 11, where the first energy storage device is a battery and the second energy storage device is a capacitor.

15. The method of claim 11, where the second energy storage device absorbs the transient electrical load.

16. A method for starting an engine including a start in a vehicle including a first energy storage device and a second energy storage device electrically coupled to a starter, comprising:
- electrically coupling the second energy storage device to the starter; and
- electrically coupling the first energy storage device in series with the starter and the second energy storage device after the second energy storage device is electrically coupled to the starter.

17. The method of claim 16, where the second energy storage device is a capacitor, and where the first energy storage device is a battery.

18. The method of claim 17, further comprising electrically coupling the second energy storage device to an electrical load in response to a transient electrical load.

19. The method of claim 18, where the transient electrical load is caused by an electric power assisted steering system.

20. The method of claim 19, where the second energy storage device absorbs a voltage spike from the electric power assisted steering system.

* * * * *